United States Patent [19]
Helwig, Jr.

[11] 4,316,229
[45] Feb. 16, 1982

[54] ELECTRIC CURRENT DETECTOR CIRCUIT

[75] Inventor: William F. Helwig, Jr., Downers Grove, Ill.

[73] Assignee: Avtec Industries, Inc., Downers Grove, Ill.

[21] Appl. No.: 57,944

[22] Filed: Jul. 16, 1979

[51] Int. Cl.³ .............................................. H02H 3/16
[52] U.S. Cl. ...................................... 361/42; 361/44; 361/45
[58] Field of Search ............................ 361/42, 44, 45

[56] References Cited

U.S. PATENT DOCUMENTS

| | | | |
|---|---|---|---|
| 3,505,566 | 4/1970 | Conrad | 361/44 |
| 3,512,045 | 5/1970 | Tipton et al. | 361/44 |
| 4,163,269 | 7/1979 | Helwig, Jr. et al. | 361/42 |

*Primary Examiner*—Harry E. Moose, Jr.
*Attorney, Agent, or Firm*—Edward D. Gilhooly

[57] ABSTRACT

An electric current detector circuit for sensing a leakage of electrical current in a particular system and then providing a signal to control the operation of the system. The circuit is also adapted to receive a signal upon the occurrence of fire, in and around the system attached thereto, and then provide a signal to further control the operation of the system.

4 Claims, 1 Drawing Figure

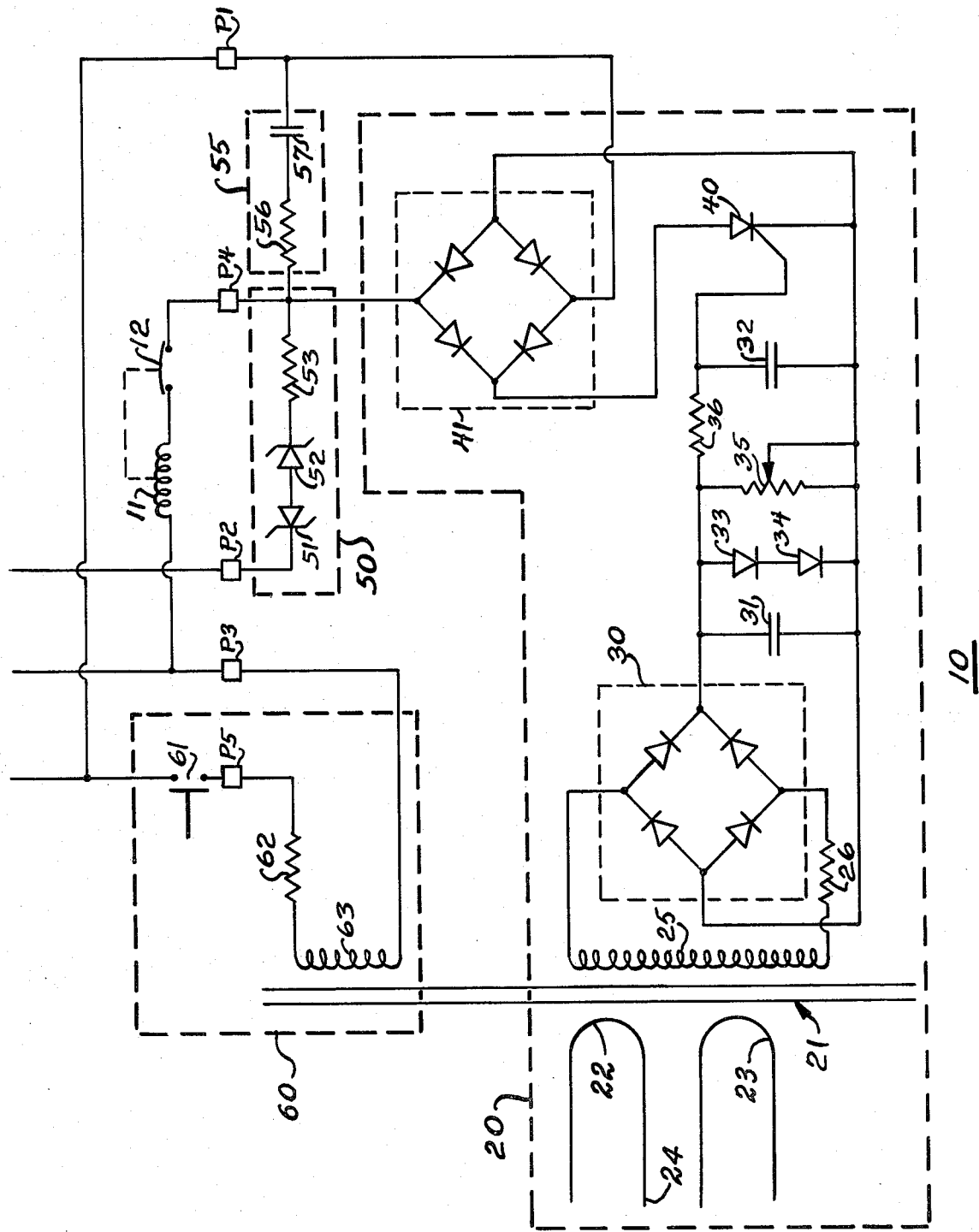

ELECTRIC CURRENT DETECTOR CIRCUIT

BACKGROUND OF THE INVENTION

This invention relates generally to electric current detectors and more particularly, to a ground fault detector circuit for controlling the operation of a system connected thereto upon the occurence of a leakage of electric current or upon an input signal from a fire extinguisher system. The ground fault and fire detector circuitry of this invention has numerous applications and can be particularly used in industrial or commercial plants, manufacturing facilities, restaurants, kitchens, workshops, basements, assembly lines, public buildings, and virtually any other facility where a hazardous condition could arise due to a ground fault.

It is commonly known that a ground fault results when a failure in an electrical circuit permits leakage current or fault current to flow therein from a hot wire to ground. Such ground faults occur for many reasons such as for example, from worn insulations, the presence of moisture, deterioration in equipment from age or abuse, and from line to line short circuits in power lines.

Generally, it has been encountered that such leakage current can likewise exist between a ground on equipment and other electrical devices in industrial facilities, plants, and the like, and the earth ground. Particularly, when a ground fault occurs, a potentially hazardous condition can be created by which personnel in certain work areas may receive a sudden electrical shock upon contact with the electrical equipment in those areas. Another problem exists when a fire condition arises in the vicinity of the equipment necessitating disconnecting of power lines to minimize serious injury and damage.

In previous electric current detector circuits, failures of the devices were encountered when the fault or leakage current exceeded the specifications of the circuitry which would occur when the fault current reached a level of approximately three hundred amperes, a condition which could occur in actual practice.

It would therefore, be desirable to provide an electric current detector circuit which will both dependably and efficiently sense the presence of a leakage current over an increased range of values or the presence of a fire and thereby provide a signal to the electrical system connected thereto, to disconnect the power lines from the electrical system.

SUMMARY OF THE INVENTION

It is therefore, an object of the present invention to improve electric current detector circuits.

Another object of the present invention is to improve electrical current detector circuits by utilizing an integral package formed of very few components and being relatively simple in construction.

Still another object of the present invention is to utilize a simplified test coil with an electric current detector circuit for simulating a ground fault for testing purposes.

It is still another object of this invention to increase the maximum value of the range of current for operation of the current detector circuit.

These and other objects are attained in accordance with the invention wherein there is provided an electric current detector circuit to sense a current leakage or receive a fire warning input signal and thereby provide a signal to control the operation of a system connected thereto. Upon the occurence of a current leakage condition the present invention will provide a signal to disconnect electrical loads from power lines connected thereto. Fire extinguisher systems are typically utilized for detecting or sensing a fire condition in an around electrical equipment associated therewith and can be operatively connected to the present invention so as to cause a disconnection of the power lines from the electrical equipment upon the occurence of a fire.

The electric current detector circuit of the present invention is operatively positioned with respect to at least one wire for initiating a fault current. The electric current detector circuit of the present invention is particularly efficient and economical in that it is very small and compact in size, relatively inexpensive to manufacture, very rugged in construction, and able to withstand extremely high voltage breakdown and has been determined to be able to withstand a maximum fault current on the order of 25,000 amperes.

BRIEF DESCRIPTION OF THE DRAWING

These and other objects and advantages of the present invention will become more fully apparent from the following detailed description in conjunction with the accompanying drawing wherein the FIGURE is an electrical schematic for an electric current detector circuit incorporating a preferred embodiment of this invention.

DETAILED DESCRIPTION OF THE PREFERRED EMBODIMENT

For convenience of illustration, the electric current detector circuit is disclosed in conjunction with a ground fault and fire detector system as described in a U.S. patent application, Ser. No. 794,356, now U.S. Pat. No. 4,163,269 entitled GROUND FAULT AND FIRE DETECTOR SYSTEM. However, the present invention is not intended to be so limited and can function in other applications requiring detection of current in a wire.

Referring now in detail to the FIGURE, there is illustrated the electric current detector circuit 10 of the present invention including a shunt coil 11, a circuit breaker 12, a current detection portion 20, a fire signal reception portion 50 and a test winding portion 60.

The current detection portion 20 of the electric current detector circuit 10 includes a current sensing transformer 21 for monitoring current carrying conductors 22 and 23 to a given device and detecting or sensing a leakage current or fault current on the conductors 22 and 23. The transformer 21 has a primary 24 and a secondary 25 which is connected to a full-wave sense rectifier 30. The secondary 25 of the transformer 21 may be suitably formed of a multi-turn coil wrapped around a core made of a steel known as silicon ferrite.

If no ground fault leakage is present, the conductors 22 and 23 carry a balanced load. However, when a ground fault is present, a portion of the electrical energy leaks to ground from the conductors causing an imbalance in the current carrying conductors 22 and 23. The imbalance in the conductors induces a proportional alternating electrical signal into the current transformer 21. This alternating current signal is rectified into a direct current signal by the rectifier 30. A current limiting resistor 26 is connected between the secondary 25 and the rectifier 30 to limit the amount of current that flows from the secondary 25 through the rectifier 30.

The rectifier 30 is operatively coupled to a silicon controlled rectifier (SCR) 40 and the direct current output of the rectifier 30 drives the gate of the SCR 40 to "turn on" the gate of the SCR 40. Interconnected between the rectifier 30 and the SCR 40 are a pair of capacitors 31 and 32, two diodes 33 and 34, a trim potentiometer 35 and a current limiting resistor 36. The capacitors 31 and 32 acts as transient suppressors to prevent false "turn off" of the gate of the SCR 40 by natural high voltage spikes. The current limiting resistor 26 also acts to limit the current that flows into the diodes 33 and 34, while diodes 33 and 34 function to limit the forward gate voltage applied to the SCR 40 to less than 10 volts which protects the SCR 40 from destructive over voltage in the case of gross ground faults. The trim potentiometer 35 and the resistor 36 tailor the signal from the rectifier 30 to the SCR 40 allowing the SCR 40 to "turn on" when the current on any of the faulted conductors passing through the transformer 21 one time is 0.5 amps. Successive passes by all the current carrying conductors through the transformer 21 reduce the tolerable ground fault leakage at the device being protected while maintaining the limited voltage level at the SCR 40.

When the SCR 40 is "turned on", it cooperates with a full wave bridge 41 to perform the function of an ac switch. The full wave bridge 41 receives power from a 24 VAC power source through pin P1 and functions with the SCR 40 to allow an alternating current electrical voltage to flow through pin P4 into the shunt trip coil 11 coupled to the circuit breakers 12 to turn all the poles of the circuit breaker off. This will effectively disconnect power lines from the electric system connected thereto.

Upon the occurrence of a fire condition in or around the system, a 120 VAC fire warning input signal will enter the fire signal reception portion 50 of the electric current detector circuit 10 through pin P2 and then pass through limiting resistor 53 and two zener diodes 51 and 52 which block out voltages above a certain value. The fire warning input signal can then pass to the shunt coil 11 of the circuit breaker 12 through pin P2. This will effectively break the connection between the electrical system and the power source connected thereto.

A snubber circuit 55 is utilized to limit the voltage across the full wave bridge 41 when the 120 VAC signal is introduced through pin P2 into the fire signal reception portion 50. The snubber circuit 55 includes a resistor 56 and a capacitor 57.

The test winding portion 60 of the electric current detector circuit 10 is provided to allow the testing of the circuit 10. Upon the closing of normally open test switch 61, a current is introduced from the 24 VAC power source. The current will then pass through pin P5 to the limiting resistor 62 and the test winding 63, providing an excess of 0.5 amps into the current transformer 21 thereby simulating a ground fault and allowing the testing of the electric current detector circuit 10.

If the circuit 10 is in proper working order, this simulated ground fault condition will allow a signal to be passed through the current detection portion 20 to the shunt coil 11 and circuit breaker 12 thereby disconnecting the electrical system from the power lines connected thereto.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electric current detector circuit for controlling the operation of equipment comprising:
   detector means for sensing a leakage of current and providing a first signal indicative of the current leakage condition;
   said detector means operatively positioned with respect to at least one wire for initiating said first signal;
   switching means connected to a source of electrical power and responsive to said first signal to generate a second signal;
   said switching means includes a silicon controlled rectifier adapted to receive said first signal;
   said switching means further includes a full-wave bridge coupled to said silicon controlled rectifier which upon the reception of said first signal functions as an ac switch to thereby generate said second signal;
   disabling means responsive to said second signal for deactivating the operation of the equipment;
   reception means operatively coupled to receive a warning signal;
   said reception means being connected to said disabling means and acting to generate a warning control signal for alternatively deactivating the operation of the equipment; and
   said reception means including diode means to limit the voltage of the warning signal applied thereto.

2. The electric current detector circuit of claim 1 wherein the reception means includes a pair of zener diodes and a current limiting resistor.

3. The electric current detector circuit of claim 1 further including a testing means coupled to said source of electrical power for simulating a current leakage condition to test the operation of the circuitry.

4. The electric current detector of claim 3 wherein the testing means includes a test winding and a current limiting resistor.

* * * * *